United States Patent
Fischer

(10) Patent No.: US 11,704,987 B2
(45) Date of Patent: Jul. 18, 2023

(54) INCREASING THE SUCTION POWER IN AN ASPIRATING SMOKE DETECTOR (ASD) TO SHORTEN THE TRANSPORT TIME FROM A DETECTED MINIMUM SIGNAL LEVEL VALUE WITHOUT THE OUTPUT OF AN INTERRUPTION SIGNAL

(71) Applicant: Siemens Schweiz AG, Zürich (CH)

(72) Inventor: Martin Fischer, Bülach (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 17/745,241

(22) Filed: May 16, 2022

(65) Prior Publication Data

US 2022/0383721 A1   Dec. 1, 2022

(30) Foreign Application Priority Data

May 18, 2021 (EP) .................................... 21174278
Feb. 28, 2022 (EP) .................................... 22159123

(51) Int. Cl.
| | |
|---|---|
| G08B 17/10 | (2006.01) |
| G01N 1/24 | (2006.01) |
| G05B 15/02 | (2006.01) |
| G08B 29/04 | (2006.01) |
| G08B 29/14 | (2006.01) |

(52) U.S. Cl.
CPC .............. *G08B 17/10* (2013.01); *G01N 1/24* (2013.01); *G05B 15/02* (2013.01); *G08B 29/043* (2013.01); *G08B 29/145* (2013.01)

(58) Field of Classification Search
CPC .... G08B 17/10; G08B 29/043; G08B 17/113; G05B 15/02; G01N 1/24
See application file for complete search history.

(56) References Cited

U.S. PATENT DOCUMENTS

| | | | |
|---|---|---|---|
| 2011/0087467 A1* | 4/2011 | Linden ................. | G08B 17/10 703/1 |
| 2013/0238138 A1 | 9/2013 | Cole ...................... | G05B 15/02 |

(Continued)

FOREIGN PATENT DOCUMENTS

| | | | | |
|---|---|---|---|---|
| EP | 1 006 500 | 6/2000 | ............ | G08B 17/10 |
| EP | 1 638 062 | 3/2006 | ............ | G08B 29/04 |

(Continued)

*Primary Examiner* — Ojiako K Nwugo
(74) *Attorney, Agent, or Firm* — Slayden Grubert Beard PLLC

(57) ABSTRACT

The present disclosure relates to aspirating smoke detectors (ASD). In an ASD, ambient air is aspirated and is fed to a fire detector unit for determining a signal level. For normal operation, the suction power is set to a nominal airflow value and this is increased from a minimum signal level value in order to shorten the transport time of aspirated smoke through the suction pipe to the fire detector unit. In some embodiments, an interruption signal provided for normal operation is output if the airflow exceeds an upper limit value for a minimum period. Independently thereof, the suction power is increased from the minimum signal level value only to the extent that the airflow does not exceed the upper limit value. Or, regardless thereof, the suction power is increased only for a timespan smaller than the minimum period in which the airflow exceeds the upper limit value.

13 Claims, 1 Drawing Sheet

(56) References Cited

U.S. PATENT DOCUMENTS

2019/0201594 A1* 7/2019 Shelton, IV ........... G16H 70/20
2021/0043055 A1* 2/2021 Matsukuma ........... G08B 29/20

FOREIGN PATENT DOCUMENTS

| EP | 2 244 236 | 10/2010 | ............. G08B 17/10 |
| EP | 2 407 946 | 1/2012 | ............. G08B 17/10 |
| WO | 2014059479 | 4/2014 | ............... G01F 1/66 |

* cited by examiner

INCREASING THE SUCTION POWER IN AN ASPIRATING SMOKE DETECTOR (ASD) TO SHORTEN THE TRANSPORT TIME FROM A DETECTED MINIMUM SIGNAL LEVEL VALUE WITHOUT THE OUTPUT OF AN INTERRUPTION SIGNAL

CROSS-REFERENCE TO RELATED APPLICATIONS

This application claims priority to EP Application No. 22159123.3 filed Feb. 28, 2022 and EP Application No. 21174278.8 filed May 18, 2021, the contents of which are hereby incorporated by reference in their entirety.

TECHNICAL FIELD

The present disclosure relates to smoke detectors. Various embodiments include methods for operating an aspirating smoke detector, aspirating smoke detectors, and/or computer programs for carrying out the operating methods.

BACKGROUND

Aspiration-type smoke detectors or fire detectors of this type are known in the specialist terminology as aspirating smoke detectors (ASDs). An aspirating smoke detector is described in the patent application EP 2 244 236 A1. By increasing the fan rotary speed and thus by increasing the suction power, the transport time of aspirated ambient air with smoke through the suction pipe to the fire detector unit is shortened. Thereby, a more rapid fire detection is possible.

In the patent application EP 2 407 946 A1, there methods and corresponding aspirating smoke detectors for recognizing blockages and interruptions in a pipe system. Air is aspirated by means of a fan, via the pipe system, from spaces and facilities to be monitored and is monitored for fire characteristics. The airflow of at least one part of the aspirated air and the air temperature are measured. A blockage signal is output if the airflow falls below a predetermined lower limit value and/or an interruption notification is output if the airflow exceeds a predetermined upper limit value. The rotary speed of the fan is increased with increasing air temperature and is reduced with decreasing air temperature.

The term "airflow" means the air volume flow rate $\dot{V}$ or the air mass flow rate $\dot{m}$. It is therefore a time-dependent physical variable. The air volume flow rate $\dot{V}$ and the air mass flow rate $\dot{m}$ are linked to one another according to the physical relationship $\dot{m}=\rho\cdot\dot{V}$ via the density $\rho$.

The term "normal operation" means the fire-free or smoke-free normal operation. It exists, for example, following the commissioning or servicing of an aspirating smoke detector.

The term "suction pipe" means a pipe system or a hose system. The suction pipe can comprise a single pipe, e.g., made of a plastics material, or a plurality of partial pipes which are split by means of a pipe distributor, for example. The suction pipe typically has a circular cross-section with a diameter in the range of 1 cm to 5 cm or in the range of 2 cm to 3 cm. In particular, the suction pipe has a minimum pipe length of 30 m or 50 m. Present or introduced along the suction pipe is a plurality of suction openings. They can be present at equal spacings along the suction pipe, for example, at a spacing of 4 m to 8 m.

The signal level of a fire characteristic that is to be determined by measuring is typically a concentration level or a concentration value of detected smoke or a detected combustion gas as a possible fire characteristic. Smoke contains particles of different sizes that are also referred to as smoke aerosols. A typical combustion gas is, for example, carbon monoxide or ammonia. The fire detector unit can have an optical detector unit according to, for example, the scattered light principle or the transmitted light principle or a gas sensor that is sensitive to combustion gases, for example, a CO gas sensor. The minimum signal level value is rated, in particular, so that a sufficiently high probability for a possible fire event exists, i.e. is significant for a possible fire event. The setting of the minimum signal level value can be based upon empirical values from a similar environment of fire monitoring or can take place by measuring technology with a fire test on site.

The signal level of a fire characteristic that is to be determined by measuring is typically a concentration level or a concentration value of detected smoke or a detected combustion gas as a possible fire characteristic. The minimum signal level value is rated, in particular, so that a sufficiently high probability for a possible fire event exists, i.e. is significant for a possible fire event. The suction unit—typically a fan—and the fire detector unit are typically, but not necessarily accommodated in a common housing as a modular unit. Seen in the flow direction, the suction unit of the fire detector unit can be connected upstream or downstream. The fire detector unit can have an optical detector unit according to the scattered light principle or the transmitted light principle and/or can have a gas sensor unit for combustion gases.

Aspirating smoke detectors typically have a fan (aspirator). It draws air samples out of spaces via a suction pipe and leads them to a fire detector unit. The suction pipes can extend over several 100 m. Aspirated air is therefore to be detected over the entire length as far as the fire detector unit. The time required for this is also referred to as dead time or transport time. For long suction pipes, the transport time can be in the range of minutes. Thus, the maximum transport time for a pipe length of 200 m with a mean flow velocity of 1 m/s and a smoke aspiration at a pipe end remote from the fire detector unit can be 200 seconds.

Typically, an "ASD planner" calculates the essential parameters so that an aspirating smoke detector meets the relevant standards therefor, for example, the standard EN 54-20 applicable for Europe in the version relevant for the time point of the present patent application, of February 2009 or the standard UL268 applicable for North America, e.g. from the 6th or 7th issued version. Different parameters play a role therein, for example, the pipe length, the space size, the number of suction openings, the suction pressure and the sensitivity of the fire detector unit. For the technical design of an aspirating smoke detector, different software-supported development tools are known, such as, for example, the ASYST development tool from Siemens. As soon as the parameters are determined, the suction pipe is assembled by a technician, suction openings in the form of holes are bored into the suction pipe and the fire detector unit is configured according to the specifications.

Typically, the suction power of the fan is adjusted via the set rotary speed in order to set an airflow with a nominal airflow value through the suction pipe. This rotary speed then remains constant, during smoke-free and/or fire-free normal operation, over the lifetime of the detector. In this normal operation, an aspirating smoke detector is thus parameterized with a low fan speed in order to extend its lifespan and to minimize the noise level during the aspiration. The reason for the statistical adjustment is the detection of interruptions with an associated increase in the airflow or the detection of blockages of the suction openings by dirt with an associated decrease in the airflow over the operating time of the aspirating smoke detector. As soon as the airflow, for example, according to the aforementioned EN 54-20 deviates by ±20% from the nominal airflow value, a fault is to be output by the aspirating smoke detector within a time of 300 seconds specified in the standard. In the standard UL268, preferably from the 6th or 7th issue, 90 seconds applies instead of the aforementioned 300 seconds. The nominal airflow value measured in liters per second or liters per minute is typically set during the commissioning of an aspirating smoke detector.

SUMMARY

The teachings of the present disclosure include an improved method for operating an aspirating smoke detector, a more reliable method for operating an aspirating smoke detector, and/or an improved aspirating smoke detector which functions more reliably in operation. For example, some embodiments include a method for operating an aspirating smoke detector (ASD), wherein the aspirating smoke detector (ASD) is provided for detecting a fire in a space to be monitored and for outputting a fire alarm (AL) in the event of a detected fire, wherein ambient air is aspirated by means of a suction unit (L) of the aspirating smoke detector (ASD) via a suction pipe (R) of the aspirating smoke detector (ASD) provided with suction openings (OF) for smoke or combustion gas to be detected, and is fed to a fire detector unit (DET) of the aspirating smoke detector (ASD) for determination by measurement of a signal level (DL) of a fire characteristic, and wherein for normal operation, the suction power (P) of the suction unit (L) is set to generate an airflow ($\dot{V}$, $\dot{m}$) through the suction pipe (R) to a nominal airflow value (NW), and wherein the suction power (P) is increased from a minimum signal level value (MIN) of the signal level (DL) in order to shorten the transport time (T) of aspirated ambient air with smoke and/or combustion gas through the suction pipe (R) to the fire detector unit (DET), characterized in that an interruption signal (U) provided for normal operation is output if the airflow ($\dot{V}$, $\dot{m}$) exceeds an upper limit value ($\dot{V}+$, $\dot{m}+$) for a minimum period (ZR), and in that, regardless thereof, the suction power (P) is increased from the minimum signal level value (MIN) only to the extent that the airflow ($\dot{V}$, $\dot{m}$) does not exceed the upper limit value ($\dot{V}+$, $\dot{m}+$) or in that regardless thereof, the suction power (P) from the minimum signal level value (MIN) is increased only for a timespan smaller than the minimum period (ZR) in which the airflow ($\dot{V}$, $\dot{m}$) exceeds the upper limit value ($\dot{V}$, $\dot{m}$).

In some embodiments, the suction power (P) of the suction unit (L) is increased to shorten the transport time (T) when a warning signal, in particular a prewarning or alert signal is received from a higher-level fire alarm control panel or command center.

In some embodiments, the signal level (DL) of the fire characteristic is analyzed and evaluated as to whether a fire event exists or not, and wherein the suction power (P) of the suction unit (L) is reduced after completion of the analysis and evaluation and independently of the minimum period (ZR) such that the airflow ($\dot{V}$, $\dot{m}$) again falls below the upper limit value ($\dot{V}+$, $\dot{m}+$), in particular, such that the airflow ($\dot{V}$, $\dot{m}$) is set again to the nominal airflow value (NW).

In some embodiments, a blockage signal (V) is output if the airflow ($\dot{V}$, $\dot{m}$) falls below a lower limit value ($\dot{V}-$, $\dot{m}-$) for a minimum period (ZR).

In some embodiments, the upper limit value ($\dot{V}+$, $\dot{m}+$) for the airflow ($\dot{V}$, $\dot{m}$) is set to 1.2 times the nominal airflow value (NW), wherein the lower limit value ($\dot{V}-$, $\dot{m}-$) for the airflow ($\dot{V}$, $\dot{m}$) is set to 0.8 times the nominal airflow value (NW) and wherein the minimum period (ZR) is set to a duration of 90 seconds or 300 seconds.

In some embodiments, the upper and lower limit value ($\dot{V}+$, $\dot{m}+$; $\dot{V}-$, $\dot{m}-$) for the airflow ($\dot{V}$, $\dot{m}$) in relation to the nominal airflow value (NW) and a duration value for the minimum period (ZR) are set according to a national, regional or international standard, primarily the European standard EN 54-20, preferably the version dated February 2009 or the standard UL268, preferably from the 6th or 7th issue.

As another example, some embodiments include an aspirating smoke detector (ASD), which has at least a fire detector unit (DET) for determination by measurement of a signal level (DL) of a fire characteristic, a suction unit (L), a power control unit (DR) for setting a suction power (P) of the suction unit (L), a suction pipe (R) connected to the suction unit (L) having suction openings (OF) for aspirating ambient air with smoke and/or combustion gas that is to be detected, an airflow meter (SEN), in particular a flow meter, for acquiring an airflow ($\dot{V}$, $\dot{m}$) of the aspirated ambient air, and an electronic control unit (MC) connected to the fire detector unit (DET), the airflow meter (SEN) and the power control unit (DR), configured to adjust the suction power (P) of the suction unit (L) by means of the power control unit (DR) to a nominal airflow value (NW) for normal operation, to increase the suction power (P) from a detected minimum signal level value (MIN) by means of the power control unit (DR) to shorten the transport time (T) and to output a fire alarm (AL) in the event of a detected fire, characterized in that the control unit (MC) is configured to output an interruption signal (U) provided for normal operation if the acquired airflow ($\dot{V}$, $\dot{m}$) exceeds a predetermined upper limit value ($\dot{V}+$, $\dot{m}+$) for a minimum period (ZR), and in that the control unit (MC) is configured to increase the suction power (P) from the minimum signal level value (MIN) only to the extent that the airflow ($\dot{V}$, $\dot{m}$) does not exceed the upper limit value ($\dot{V}+$, $\dot{m}+$), or in that the control unit (MC) is configured to increase the suction power (P) from the minimum signal level value (MIN) only for a timespan shorter than the minimum period (ZR) in which the airflow ($\dot{V}$, $\dot{m}$) exceeds the upper limit value ($\dot{V}$, $\dot{m}$).

In some embodiments, the aspirating smoke detector (ASD) has a communication interface connected to the control unit (MC) and wherein the control unit (MC) is configured, in the case of the reception of a warning signal from the communication interface, in particular a prewarning or alert signal, to increase the suction power (P) of the suction unit (L) in order to shorten the transport time (T).

In some embodiments, the control unit (MC) is configured to reduce the suction power (P) by means of the power control unit (DR) shortly before reaching the end of the minimum period (ZR) such that the airflow ($\dot{V}$, $\dot{m}$) again falls below the upper limit value ($\dot{V}+$, $\dot{m}+$).

In some embodiments, the electronic control unit (MC) is configured to analyze the signal level (DL) of the fire characteristic and to evaluate whether a fire event exists or not, and is configured to reduce the suction power (P) of the suction unit (L) after completion of the analysis and evaluation and independently of the minimum period (ZR) such that the airflow ($\dot{V}$, $\dot{m}$) again falls below the upper limit value ($\dot{V}+$, $\dot{m}+$), in particular, such that the airflow ($\dot{V}$, $\dot{m}$) is set again to the nominal airflow value (NW).

In some embodiments, the electronic control unit (MC) is configured to output a blockage signal (V) if the acquired airflow ($\dot{V}$, $\dot{m}$) falls below a predetermined lower limit value ($\dot{V}-$, $\dot{m}-$) for a predetermined minimum period (ZR).

In some embodiments, for a data access to the upper and lower limit value ($\dot{V}+$, $\dot{m}+$; $\dot{V}-$, $\dot{m}-$) and the nominal airflow value (NW) and the minimum period (ZR), the electronic control unit (MC) has a non-volatile memory store (MEM), wherein the upper limit value ($\dot{V}+$, $\dot{m}+$) is 1.2 times and the upper limit value ($\dot{V}-$, $\dot{m}-$) is 0.8 times the stored nominal airflow value (NW) and wherein the minimum period (ZR) has a duration of 90 seconds or 300 seconds.

In some embodiments, the electronic control unit (MC) has a non-volatile memory store for a data access to the upper and lower limit value ($\dot{V}+$, $\dot{m}+$; $\dot{V}-$, $\dot{m}-$) in relation to the nominal airflow value (NW) and the minimum period (ZR), wherein the upper and lower limit value ($\dot{V}+$, $\dot{m}+$; $\dot{V}-$, $\dot{m}-$) and the minimum period (ZR) are set according to a national, regional or international standard, in particular the European standard EN 54-20, the version dated February 2009 or the standard UL268, from the 6th or 7th issue.

As another example, some embodiments include a computer program product (PRG) for carrying out the operating method as described herein on an electronic control unit (MC) of an aspirating smoke detector (ASD), wherein the electronic control unit (MC) has an electronic memory store (MEM) for storing the computer program product (PRG) and for storing the minimum signal level value (MIN) and the nominal airflow value (NW) as operating parameters (PAR), and possibly for storing the upper limit value ($\dot{V}+$, $\dot{m}+$) for the airflow ($\dot{V}$, $\dot{m}$), the lower limit value ($\dot{V}-$, $\dot{m}-$) for the airflow ($\dot{V}$, $\dot{m}$), and/or the minimum period (ZR) as further operating parameters (PAR).

BRIEF DESCRIPTION OF THE DRAWINGS

The invention and advantageous embodiments of the present invention will now be described by reference to the accompanying drawings, in which.

DETAILED DESCRIPTION

Figure 1:
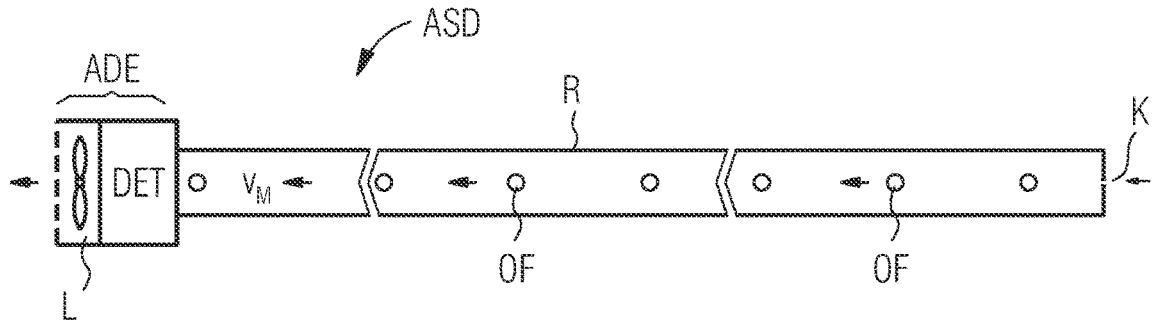
FIG. 1 is a drawing showing an exemplary structure of an aspirating smoke detector incorporating teachings of the present disclosure in smoke-free normal operation.

In some of the methods described herein, an aspirating smoke detector is provided for detecting a fire in a space being monitored and for outputting a fire alarm in the event of a detected fire, typically to a fire alarm control panel (FACP). Herein, ambient air is aspirated by means of a suction unit of the aspirating smoke detector via a suction pipe of the aspirating smoke detector provided with suction openings for smoke or a combustion gas that is to be detected and a fire detector unit of the aspirating smoke detector for determination by measurement of a signal level of a fire characteristic. The suction power of the suction unit for generating an airflow through the suction pipe is set to a nominal airflow value for normal operation, i.e. to a nominal airflow value provided for normal operation. Finally, the suction power is increased from a minimum signal level value of the signal level in order to shorten the transport time of aspirated ambient air with smoke and/or combustion gas through the suction pipe to the fire detector unit.

The aspirating smoke detector comprises at least one fire detector unit for determining by measurement a signal level of a fire characteristic, a suction unit, a power control unit for setting the suction power of the suction unit and a suction pipe connected to the suction unit, having suction openings, for aspirating ambient air with smoke and/or combustion gas to be detected. Furthermore, the aspirating smoke detector comprises an airflow meter, in particular a volume flow meter, for acquiring an airflow of the aspirated ambient air and an electronic control unit connected to the fire detector unit, the airflow meter and the power control unit. Said electronic control unit is configured to adjust the suction power of the suction unit by means of the power control unit to a nominal airflow value for normal operation, to increase the suction power from a minimum signal level value by means of the power control unit to shorten the transport time and to output a fire alarm in the event of a detected fire. The suction unit and the fire detector unit typically form a modular unit.

In some embodiments, in fire-free or smoke-free normal operation, an interruption signal is output when the airflow exceeds an upper limit value for a minimum period. Therein, regardless thereof, the suction power is increased from the minimum signal level value, i.e. with the exceeding of the minimum signal level value, in particular to shorten the transport time only to the extent that the airflow does not exceed the upper limit value, or the suction power is increased from the minimum signal level value, i.e. with the exceeding of the minimum signal level value, in particular to shorten the transport time only for a timespan that is shorter than the minimum period in which the airflow exceeds the upper limit value. In other words, in the latter case, the suction power is increased to shorten the transport time only within the minimum period such that the airflow exceeds the upper limit value.

Through the targeted increase of the suction power limited with regard to power and possibly temporally, it is achieved that additionally for more rapid possible fire detection, the output of a false interruption signal is prevented. An unnecessary inspection of the aspirating smoke detector by a servicing specialist is prevented. However, use of the methods described does not impair the monitoring of the aspirating smoke detector, as specified in the standard mentioned in the introduction, said monitoring functioning independently of the fire detection for an interruption and for a blockage.

If the suction power is increased only such that the airflow does not, or only just does not, exceed the nominal airflow value, this increase is, in principle, not temporally limited. In practice, however, regardless of whether a fire event is detected or not, in some examples not later than the expiry of a predetermined wait time, for example, after 10, 20 or 30 minutes, the suction power is reduced again such that the airflow reaches the nominal airflow value again. With the return to normal operation, the noise development caused by the increased suction power and the mechanical, lifespan-reducing overloading of the aspirating smoke detector caused by the increase falls back again.

If the suction power is increased such that the airflow exceeds the nominal airflow value, e.g. by 1.2 to 5 times, e.g. by 2 to 3 times, then no output of the interruption signal takes place if this increase is temporally limited to the minimum period from the time point of the exceeding of the upper limit value. In other words, the suction power of the suction unit is reduced before reaching the end of the minimum period, in particular shortly before reaching the end of the minimum period such that the airflow again falls below the upper limit value. The reduction in the suction power takes place, in particular, in a timespan of 1 s to 20 s, e.g. from 5 s to 10 s, before the expiry of the minimum period. Thereby, a time element in the control of the aspirating smoke detector is reset again. Subsequently, the increase of the suction power above the upper limit value can be initiated without an output of the interruption signal taking place.

In some embodiments, the suction power of the suction unit is increased to shorten the transport time such that the airflow does not exceed the upper limit value, or the suction power is increased only for a timespan shorter than the minimum period during which the airflow exceeds the upper limit value, specifically when a warning signal, in particular a prewarning or alert signal is received from a higher-level fire alarm control panel or command center, for example, via a signal or bus line which connects the higher-level fire alarm control panel or command center to the aspirating smoke detector. In some embodiments, the connection between the aspirating smoke detector and the fire alarm control panel and/or command center can take place wirelessly, for example, via a WLAN, Bluetooth or mobile 3G, 4G or 5G data connection. The aforementioned (data) connections can be based upon an Internet protocol.

The fire alarm control panel or the command center can also be realized as a cloud application in a cloud infrastructure. In this regard, the aspirating smoke detector can receive the warning signal via the cloud from a higher-level cloud fire alarm control panel or cloud command center. The warning signal is output when, for example, a fire alarm or an impending fire has been signaled by at least one further aspirating smoke detector in the vicinity of this aspirating smoke detector, for example, in the form of a pre-alarm to the fire alarm control panel or the command center. Due to the spatial correlation, the probability of an actual fire in the surroundings of the installed aspirating smoke detector is increased. A "leading" increase in the suction power is advantageously justified in this case for the earliest possible fire detection.

In some embodiments, a blockage signal is output when the airflow falls below a lower limit value for a minimum period.

In some embodiments, the upper limit value for the airflow is set at 1.2 times the nominal airflow value. In some embodiments, the lower limit value for the airflow is set in particular at 0.8 times the nominal airflow value. In some embodiments, the minimum period is set at a value in the region of 60 seconds to 600 seconds, to a value of 90 seconds or 300 seconds, or to a value of 90 seconds±3 seconds or 300 seconds±3 seconds.

In some embodiments, the upper and lower limit value for the airflow in relation to the nominal airflow value and a duration value for the minimum period are set according to a national, regional or international standard, in particular the European standard EN 54-20, e.g. the version dated February 2009.

In some embodiments, there is an aspirating smoke detector in which the electronic control unit is also configured or programmed to output an interruption signal provided for normal operation if the acquired airflow exceeds a predetermined upper limit value for a minimum period. In addition, the control unit is configured or programmed to increase the suction power (by means of the power control unit) from the minimum signal level value only to the extent that the airflow does not exceed the upper limit value. In some embodiments, the control unit is configured or programmed to increase the suction power (by means of the power control unit) from the minimum signal level value, i.e. with exceeding of the minimum signal level value only for a timespan shorter than the minimum period in which the airflow exceeds the upper limit value.

In other words, the control unit is configured or programmed to increase the suction power from the minimum signal level value, i.e. with the exceeding of the minimum signal level value, by means of the power control unit only within the minimum period such that the airflow as set exceeds the upper limit value. By means of the specific increase of the suction power limited with regard to power and possibly temporally that is brought about by means of the power control unit, additionally for more rapid possible fire detection, by means of the fire detector unit, the output of a false interruption signal is prevented.

If the suction power is increased only such that the airflow does not, or only just does not, exceed the nominal airflow value, this increase is, in principle, not temporally limited. In practice, however, regardless of whether a fire event is detected or not, e.g. not later than the expiry of a predetermined wait time, for example, after 10, 20 or 30 minutes, the suction power is reduced again such that the airflow reaches the nominal airflow value again. With the return to normal operation, the noise development caused by the increased suction power and the mechanical, lifespan-reducing overloading of the aspirating smoke detector caused by the increase falls back again.

If the increase of the suction power takes place such that the airflow exceeds the nominal airflow value, e.g. by 1.2 to 5 times, e.g. by 2 to 3 times, nevertheless no output of the interruption signal takes place if this increase is temporally limited to the minimum period from the time point of the exceeding of the upper limit value. The reduction in the suction power takes place, in particular, in a timespan of 1 s to 20 s, e.g. from 5 s to 10 s, before the expiry of the minimum period. Thereby, a time element in the control of the aspirating smoke detector is reset again. The control unit can also be configured, following the reduction in the suction power, to start the increase of the suction power above the upper limit value again without an output of the interruption signal taking place.

In some embodiments, the aspirating smoke detector has a communication interface connected to the control unit. The control unit is configured, in the case of the reception of a warning signal from the communication interface, in particular a prewarning or alert signal, to increase the suction power of the suction unit to shorten the transport time. In other words, in this case, the control unit is configured or programmed to increase the suction power of the suction unit by means of the power control unit such that the airflow does not exceed the upper limit value, or to increase the suction power only for a timespan shorter than the minimum period, in which the airflow exceeds the upper limit value. The communication interface can be, for example, a cable-bound communication interface for connecting a signal or bus line which connects the higher-level fire alarm control panel or command center to the aspirating smoke detector. In some embodiments, the communication interface can be a wireless communication interface, for example, a WLAN, Bluetooth or mobile 3G, 4G or 5G data interface. The aforementioned communication interface can be based upon an Internet protocol, for example.

In some embodiments, the control unit is configured to reduce the suction power, in particular shortly before reaching the end of the minimum period by means of the power control unit so that the airflow again falls below the upper limit value. "Shortly before reaching the minimum period"

is intended to mean a timespan of 1 s to 20 s, e.g. 5 s to 10 s before expiry of the minimum period.

In some embodiments, the control unit of the aspirating smoke detector is configured or programmed to analyze the signal level of the fire characteristic and to evaluate whether a fire event exists or not. It is also configured or programmed to reduce the suction power of the suction unit after completion of the analysis and evaluation and independently of the minimum period such that the airflow again falls below the upper limit value, in particular, such that the airflow becomes set again to the nominal airflow value. In the event that no fire event can be detected, the aspirating smoke detector is again in normal operation.

In some embodiments, the electronic control unit is configured or programmed to output a blockage signal if the acquired airflow falls below a predetermined lower limit value for a predetermined minimum period. As described above, by "airflow" is meant the air volume flow rate $\dot{V}$ or the air mass flow rate $\dot{m}$. The latter variables are linked to one another according to the physical relationship $\dot{m}=\rho\cdot\dot{V}$ via the density $\rho$. The density $\rho$ is linked, according to the physical relationship $$\rho = \frac{p}{R_f \cdot T}$$

to the air pressure p, the gas constant $R_f$ for the air and the air temperature T. The density $\rho$ is therefore proportional to the air pressure p and is inversely proportional to the air temperature T.

It can be assumed that the density $\rho$ during normal operation of the aspirating smoke detector is substantially constant, i.e. it changes by less than 3%, in particular by less than 2%. Such density changes therefore have no practical influence on the airflow monitoring for the aspirating smoke detector. The air volume flow rate can be measured, for example, by means of a vane anemometer as the flow meter. The air volume flow rate can be determined from the measured mean flow rate multiplied by the known pipe internal diameter.

In some embodiments, the air volume flow rate can be measured, for example, by means of a thermal airflow sensor, such as, for example, a hot wire anemometer, the output signal of which, however, is a measure of the air mass flow rate $\dot{m}$. If no appreciable changes in the ambient temperature, the air pressure or the air humidity are to be expected in the aspirated ambient air, then an uncompensated thermal airflow sensor is usable as a flow meter. Where the usage environment of the aspirating smoke detector is more challenging, such as, for example, with large variations in the ambient temperature and/or humidity, a thermal airflow meter of this type can comprise a compensation facility, as described in the aforementioned EP 2 407 946 A1. In order to take account of an acquired air temperature, an acquired air pressure and/or an acquired air humidity, the compensation facility can have a temperature sensor and possibly a pressure sensor or a humidity sensor. A compensated thermal airflow sensor of this kind can therefore function as a flow meter. A corresponding temperature, air pressure or air humidity sensor can be integrated into the suction unit or in the thermal hot wire anemometer itself.

In some embodiments, the electronic control unit has a non-volatile memory store for a data access to the upper and lower limit value and to the nominal airflow value and to the minimum period. The upper limit value is 1.2 times and the lower limit value is 0.8 times the stored nominal airflow value. The minimum period is set, in particular, to a value in the region of 60 seconds to 600 seconds, to a value of 90 seconds or 300 seconds, or to a value of 90 seconds±3 seconds or 300 seconds±3 seconds. The non-volatile memory store is, for example, an EPROM.

In some embodiments, the upper and lower limit value and the minimum period can be set to a national, regional or international standard, in particular, by way of the European standard EN 54-20, e.g. the version dated February 2009.

In some embodiments, the suction unit of the aspirating smoke detector can be a fan or a ventilator, the suction power of which increases with increasing rotary speed n of the fan.

In some embodiments, the electronic control unit is a microcontroller which is typically present or required in any event for the overall control of the aspirating smoke detector. Furthermore, the microcontroller can have one or more integrated A/D converters for acquisition by measurement of the aforementioned input variables such as air volume flow rate, air mass flow rate, signal level and possibly air temperature, air pressure and air humidity. It can also have analogue and/or digital input and output (I/O) units and communication interfaces for the output of a fire alarm, an interruption signal or a blockage signal. In the microcontroller, the upper and lower limit value for the airflow, the nominal airflow value, the minimum period and the minimum signal level value can be stored in a non-volatile memory store (EPROM) of the microcontroller. Furthermore, the power control unit and/or the electronic components for the signal preparation or signal processing of the aforementioned input variables can already be integrated in the microcontroller.

Some embodiments include a computer program product for carrying out the operating method according to the invention on an electronic control unit, in particular a microcontroller, of an aspirating smoke detector. The electronic control unit comprises an electronic memory store, for example a RAM or EPROM, for storing the computer program product and for storing the minimum signal level value and the nominal airflow value as operating parameters. If appropriate, the upper limit value for the airflow, the lower limit value for the airflow and/or the minimum period can be stored in the electronic memory store as further operating parameters.

The computer program product may comprise an electronic file which can be loaded into the electronic memory store of the electronic control unit. The computer program product can be stored, for example, on an optical or magnetic storage medium, for example, a CD, DVD or Blu-ray disk or on a magnetic hard disk. The computer program product can alternatively be stored on a memory stick, for example, a USB stick. Finally, the computer program product can also be loaded via an Intranet or the Internet as a download, at least indirectly into the electronic memory store of the electronic control unit. By this means, the more rapid fire detection can be retrofitted by way of an update of the operating software of the electronic control unit, into previously installed aspirating smoke detectors.

FIG. 1 shows an exemplary structure of an aspirating smoke detector ASD incorporating teachings of the present disclosure in smoke-free normal operation. Visible at left is a suction/detector unit ADE as a modular unit to which a suction pipe R is attached with a plurality of suction openings OF arranged in a distributed manner. The latter are usually bores which are introduced into the suction pipe R. The suction openings OF typically have a non-uniform cross-section in order to achieve, in all the suction openings OF, a substantially identical "hole sensitivity". I.e. in normal operation, each of the suction openings OF draws approximately the same suction volume per unit time. A calibration hole present at a right-hand end of the tube is identified with K. The suction/detector unit ADE shown in the left-hand part of FIG. 1 comprises a suction unit L in the form of a fan, for example a radial fan and a fire detector unit DET, arranged upstream in the flow direction. The mean flow velocity is identified with $v_M$. The airflow or air volume flow rate aspirated by the suction unit L therein corresponds to the volume per unit time from the product of the mean flow velocity $v_M$ and the pipe internal cross-section of the suction pipe R.

Figure 2:
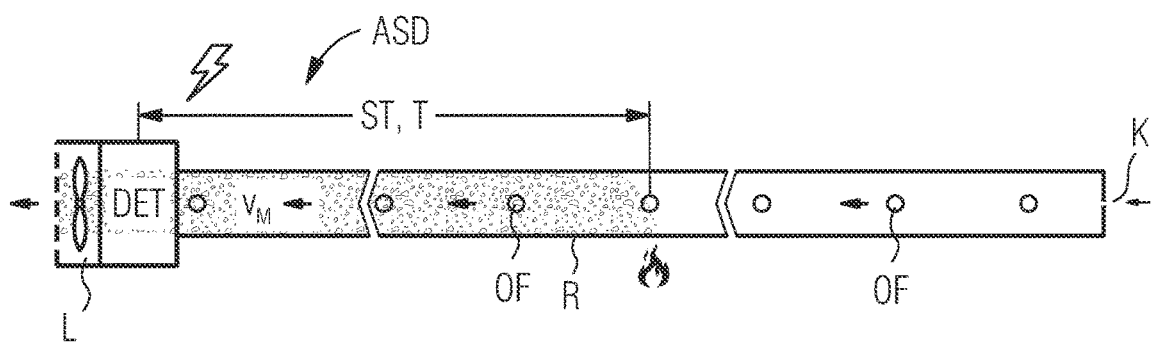
FIG. 2 is a drawings showing the example of FIG. 1 in the case of a detected fire.

FIG. 2 shows the example of FIG. 1 in the case of a detected fire. Therein, ambient air with smoke that is to be detected is aspirated at a suction opening OF, symbolized by a flame symbol, and is transported through the suction pipe R as far as the fire detector unit DET. The lightning symbol at the fire detector unit DET symbolizes a detected fire event. This is the case if a detection signal DL output by the fire detector unit DET exceeds a preset minimum detection level MIN. In the example of FIG. 2, it can be seen how the aspirated ambient air fills a transport length or pipe length ST with smoke. An associated transport time is identified with T. The transport time T therein results from the product of the mean flow velocity $v_M$ and the transport length ST shown. As described in the introduction, the transport time T can be up to several minutes.

Figure 3:
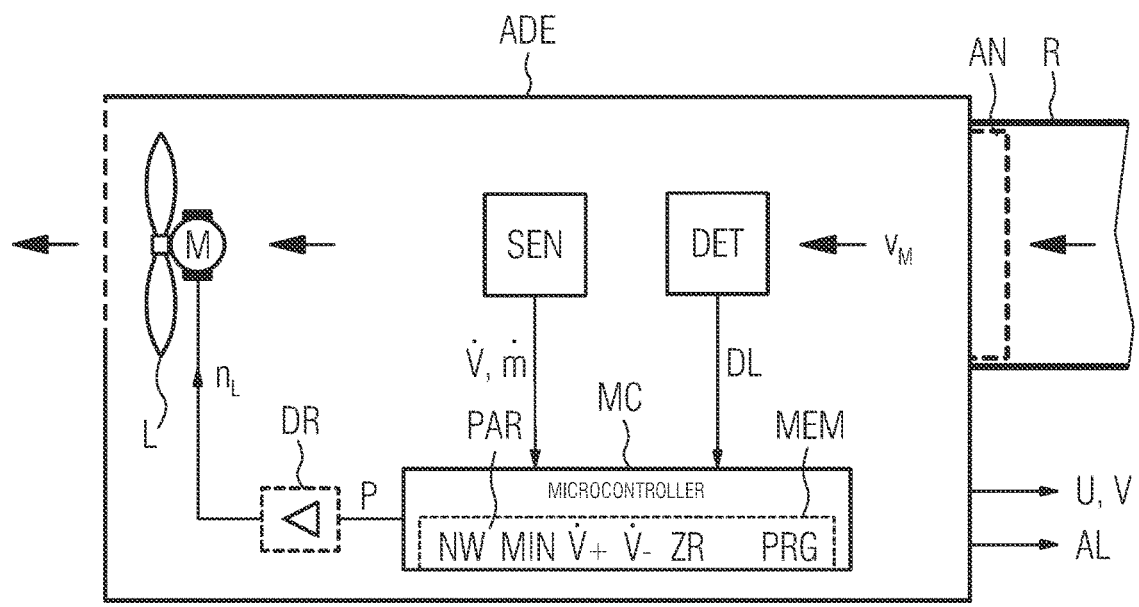
FIG. 3 is an example of an aspirating smoke detector incorporating teachings of the present disclosure.

FIG. 3 shows an example of an aspirating smoke detector ASD incorporating teachings of the present disclosure. The functional construction of the suction/detector unit ADE is shown in detail. In the right-hand portion of the suction/detector unit ADE realized as a modular unit, a pipe connection AN is shown, to which the suction pipe R is connected. The suction/detector unit ADE itself comprises the fire detector unit DET for determining by measurement the signal level DL of a fire characteristic. In the present example, said fire characteristic is a smoke concentration level.

The aspirating smoke detector ASD or the suction/detector unit ADE further comprises a power control unit DR, which is configured for setting a suction power P of the suction unit L. In the present case, the suction unit L is a fan, the suction power P of which can be set by means of a change to the fan rotary speed $n_L$. In addition, the aspirating smoke detector ASD and/or the suction/detector unit ADE has an airflow meter SEN to acquire an airflow $\dot{V}$, $\dot{m}$ of the aspirated ambient air. The airflow is an air volume flow rate $\dot{V}$ or an air mass flow rate $\dot{m}$. The airflow meter SEN therein outputs a corresponding airflow measurement signal which represents the air volume flow rate $\dot{V}$ or the air mass flow rate $\dot{m}$.

Furthermore, the aspirating smoke detector ASD or the suction/detector unit ADE has an electronic control unit MC connected to the fire detector unit DET, the airflow meter SEN and the power control unit DR. The latter is typically a microcontroller and is configured or programmed to adjust the suction power P of the suction unit L by means of the power control unit DR to a nominal airflow value NW for (smoke-free) normal operation. The adjustment of the suction power P can take place in the form of an open or closed control loop, based upon a currently acquired air volume flow rate $\dot{V}$ or air mass flow rate $\dot{m}$ as compared with the nominal airflow value NW stored in an electronic memory store MEM of the control unit MC. The control unit MC is further configured, in the event of a detected fire, to output a fire alarm AL and is configured, during normal operation, to output an interruption signal U if the acquired airflow $\dot{V}$, $\dot{m}$ exceeds a preset upper limit value $\dot{V}+$, $\dot{m}+$ for a minimum period ZR. The fire alarm AL and possibly the interruption signal U and a blockage signal V can be output by means of the electronic control unit MC, for example, to a bus interface of the suction/detector unit ADE.

The control unit MC is also configured or programmed to increase the suction power P by means of the power control unit DR from a minimum signal level value MIN of the signal level DL, i.e. when the minimum signal level MIN is exceeded, in order to shorten the transport time T of aspirated ambient air with smoke and/or with combustion gas through the suction pipe R to the fire detector unit DET.

In some embodiments, the control unit MC is configured or programmed to increase the suction power P by means of the power control unit DR from the detected minimum signal level value MIN only to the extent that the airflow $\dot{V}$, $\dot{m}$ as set does not exceed the upper limit value $\dot{V}+$, $\dot{m}+$. Both the minimum signal level value MIN and also the upper limit value $\dot{V}+$, $\dot{m}+$ for the air volume flow rate V or for the air mass flow rate $\dot{m}$ can be stored in the electronic memory store MEM for a computational comparison by the control unit MC.

In some embodiments, the electronic control unit MC can be configured to increase the suction power P from the minimum signal level value MIN only for a timespan shorter than the minimum period ZR in which the airflow $\dot{V}$, $\dot{m}$ exceeds the upper limit value $\dot{V}+$, $\dot{m}+$. In other words, the electronic control unit MC is configured or programmed to reduce the suction power P by means of the power control unit DR (shortly) before reaching the end of the minimum period ZR such that the airflow $\dot{V}$, $\dot{m}$ again falls below the upper limit value $\dot{V}+$, $\dot{m}+$.

Furthermore, the electronic control unit MC can be configured to output a blockage signal V if the acquired airflow $\dot{V}$, $\dot{m}$ falls below a predetermined lower limit value $\dot{V}-$, $\dot{m}-$ for a predetermined minimum period ZR. This lower limit value $\dot{V}-$, $\dot{m}-$ can also be stored in the electronic memory MEM for a computational comparison by the control unit MC.

Finally, a computer program product PRG and the minimum signal level value MIN and the nominal airflow value NW as operating parameters PAR, and possibly the upper and lower limit values $\dot{V}+$, $\dot{m}+$; $\dot{V}-$, $\dot{m}-$ for the airflow $\dot{V}$, $\dot{m}$ and/or the minimum period ZR can be stored as further operating parameters PAR in the electronic memory store MEM of the electronic control unit MC, preferably in a non-volatile manner. The computer program product PRG is thereby configured to carry out the operating method according to the invention on an electronic control unit MC, preferably on a processor-assisted microcontroller of the aspirating smoke detector ASD. Accordingly, it comprises suitable program steps and program routines for the operation, i.e. for the control and monitoring of the aspirating smoke detector ASD.

REFERENCE CHARACTERS

ADE Suction/detector unit
AL Fire alarm, alarm
AN Pipe connection, port
ASD Aspirating smoke detector
DET Fire detector unit
DL Signal level
DR Power control unit, driver
K Calibration hole L Suction unit, fan, pump
MC Electronic control unit, microcontroller
MEM Memory store, electronic memory, EPROM
MIN Minimum signal level value
$n_L$ Fan rotary speed
NW Nominal airflow value
OF Suction opening, bore
P Suction power
PAR Operating parameter
R Suction pipe, pipe system
SEN Air volume meter, flow meter, air mass flow meter
ST Transport length
T Transport time
U Interruption signal
V Blockage signal
$v_M$ Mean airflow velocity
ZR Period
$\dot{m}$ Air mass flow rate
$\dot{V}$ Air volume flow rate
$\dot{m}+$ Upper limit value
$\dot{m}-$ Lower limit value

The invention claimed is:

1. A method for operating an aspirating smoke detector for detecting a fire in a space to be monitored and outputting a fire alarm in the event of a detected fire, wherein ambient air is aspirated by a suction unit via a suction pipe provided with suction openings for smoke or combustion gas to be detected and is fed to a fire detector unit for determination by measurement of a signal level of a fire characteristic, and wherein for normal operation, a suction power of the suction unit is set to generate an airflow through the suction pipe to a nominal airflow value, and wherein the suction power is increased from a minimum signal level value of the signal level to shorten a transport time of aspirated ambient air with smoke and/or combustion gas through the suction pipe to the fire detector unit, the method comprising:
generating an interruption signal provided for normal operation if the airflow exceeds an upper limit value over a minimum time period; and
increasing the suction power from the minimum signal level value only to the extent that the airflow does not exceed the upper limit value; or
increasing the suction power from the minimum signal level value only for a timespan smaller than the minimum period in which the airflow exceeds the upper limit value.

2. The method as claimed in claim 1, further comprising increasing the suction power of the suction unit to shorten the transport time in response to a warning signal received from a higher-level fire alarm control panel or command center.

3. The method as claimed in claim 1, further comprising evaluating the signal level of the fire characteristic as to whether a fire event exists; and
reducing the suction power of the suction unit after completion of the evaluation and independently of the minimum period such that the airflow falls below the upper limit value.

4. The method as claimed in claim 1, further comprising generating a blockage signal if the airflow falls below a lower limit value for a minimum period.

5. The method as claimed in claim 4, further comprising:
setting the upper limit value for the airflow to 1.2 times the nominal airflow value;
setting the lower limit value for the airflow to 0.8 times the nominal airflow value; and
setting the minimum period to a duration of 90 seconds or 300 seconds.

6. The method as claimed in claim 4, further comprising setting the upper and lower limit value for the airflow in relation to the nominal airflow value and a duration value for the minimum period are set according to a national, regional, or international standard.

7. An aspirating smoke detector comprising:
a fire detector unit for determination by measurement of a signal level of a fire characteristic;
a suction unit;
a power control unit for setting a suction power of the suction unit;
a suction pipe connected to the suction unit and having suction openings for aspirating ambient air with smoke and/or combustion gas to be detected;
an airflow meter for measuring an airflow rate of the aspirated ambient air; and
an electronic control unit (ECU) connected to the fire detector unit, the airflow meter, and the power control unit, the ECU configured to: adjust the suction power of the suction unit using the power control unit to a nominal airflow value for normal operation, to increase the suction power from a detected minimum signal level value using the power control unit to shorten the transport time, and to output a fire alarm in the event of a detected fire,
wherein the ECU generates an interruption signal provided for normal operation if the acquired airflow rate exceeds a predetermined upper limit value for a minimum period; and
the ECU increases the suction power from the minimum signal level value only to the extent that the airflow does not exceed the upper limit value; or
the ECU increases the suction power from the minimum signal level value only for a timespan shorter than the minimum period in which the airflow exceeds the upper limit value.

8. The aspirating smoke detector as claimed in claim 7, further comprising a communication interface connected to the ECU;
wherein the ECU, in the case of the reception of a warning signal from the communication interface, increases the suction power of the suction unit in order to shorten the transport time.

9. The aspirating smoke detector as claimed in claim 7, wherein the ECU reduces the suction power using the power control unit shortly before reaching the end of the minimum period so the airflow again falls below the upper limit value.

10. The aspirating smoke detector as claimed in claim 7, wherein:
the ECU analyzes the signal level of the fire characteristic to evaluate whether a fire event exists; and
the ECU reduces the suction power of the suction unit after completion of the evaluation independently of the minimum period such that the airflow again falls below the upper limit value.

11. The aspirating smoke detector as claimed in claim 7, wherein the ECU generates a blockage signal if the acquired airflow falls below a predetermined lower limit value for a predetermined minimum period.

12. The aspirating smoke detector as claimed in claim 11, wherein:
the upper limit value is 1.2 times and the lower limit value is 0.8 times the nominal airflow value; and
the minimum period has a duration of 90 seconds or 300 seconds.

13. The aspirating smoke detector as claimed in claim 11, wherein the minimum period and the upper and lower limit value and the minimum period are set according to a national, regional, or international standard.

\* \* \* \* \*